United States Patent [19]

Miyakawa

[11] Patent Number: 5,796,195
[45] Date of Patent: Aug. 18, 1998

[54] ELECTRIC MOTOR

[75] Inventor: Taro Miyakawa, Wako, Japan

[73] Assignee: Honda Giken Kogyo Kabushiki Kaisha, Tokyo, Japan

[21] Appl. No.: 734,692

[22] Filed: Oct. 21, 1996

[30] Foreign Application Priority Data

Mar. 1, 1996 [JP] Japan ................... 8-044851

[51] Int. Cl.⁶ ................... H02K 11/00; H02K 1/22
[52] U.S. Cl. ................... 310/68 B; 310/261
[58] Field of Search ................... 310/68 B, 68 R, 310/261, 49 R, 156

[56] References Cited

U.S. PATENT DOCUMENTS

| | | | |
|---|---|---|---|
| 4,914,713 | 4/1990 | Mueller et al. | 388/805 |
| 4,982,125 | 1/1991 | Shirakawa | 310/88 |
| 5,194,771 | 3/1993 | Otsuki et al. | 310/68 B |
| 5,239,218 | 8/1993 | Hashimoto et al. | 310/68 B |
| 5,436,518 | 7/1995 | Kawai | 310/156 |
| 5,469,005 | 11/1995 | Asama et al. | 310/68 B |
| 5,610,457 | 3/1997 | Kurita | 310/68 B |
| 5,631,508 | 5/1997 | Cho et al. | 310/68 B |
| 5,637,945 | 6/1997 | Yamamuro et al. | 310/268 |
| 5,654,600 | 8/1997 | Nomura et al. | 310/68 B |

*Primary Examiner*—Steven L. Stephan
*Assistant Examiner*—Michael J. Wallace, Jr.
*Attorney, Agent, or Firm*—Merchant, Gould, Smith, Edell, Welter & Schmidt, P.A.

[57] ABSTRACT

An electric motor comprises a rotor rotational position indicator formed internally with a pole field portion of a rotor thereof, and a notch disposed between the pole field portion and the rotor rotational position indicator for suppressing the magnetic influence, the notch being filled with nonmagnetic materials. By virtue of the notch, the pole field and its magnetic influence upon a sensor can be suppressed, whereby appropriate home position and incremental pulses can be generated to enable accurate detection of a rotational position of the rotor.

5 Claims, 8 Drawing Sheets

FIG. 3A
FIG. 3B
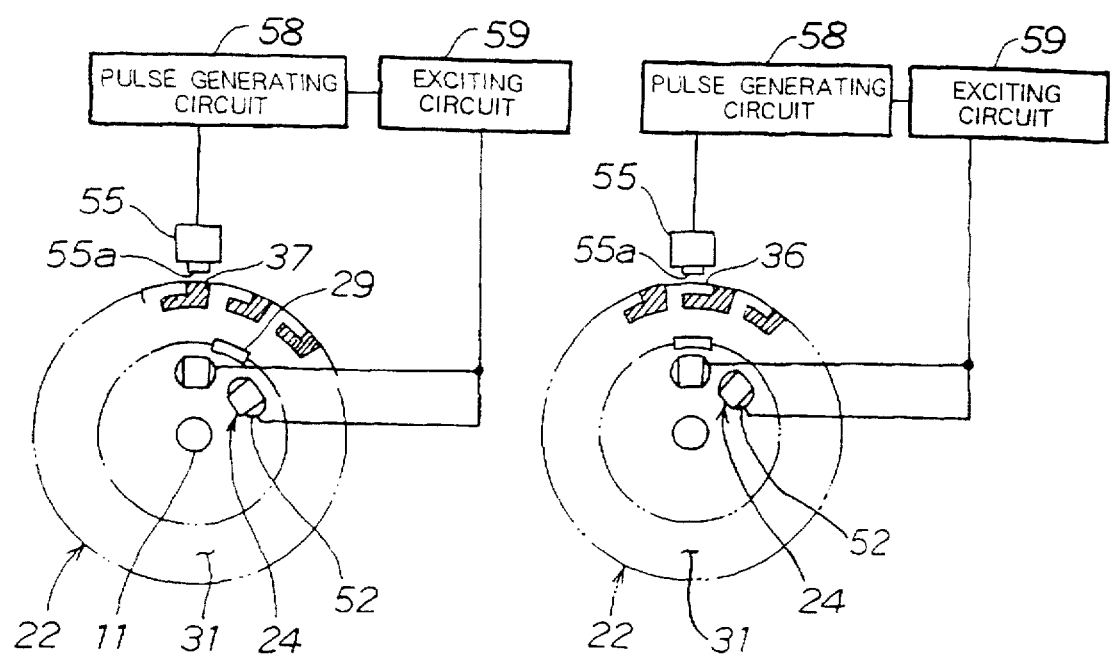
FIG. 3C
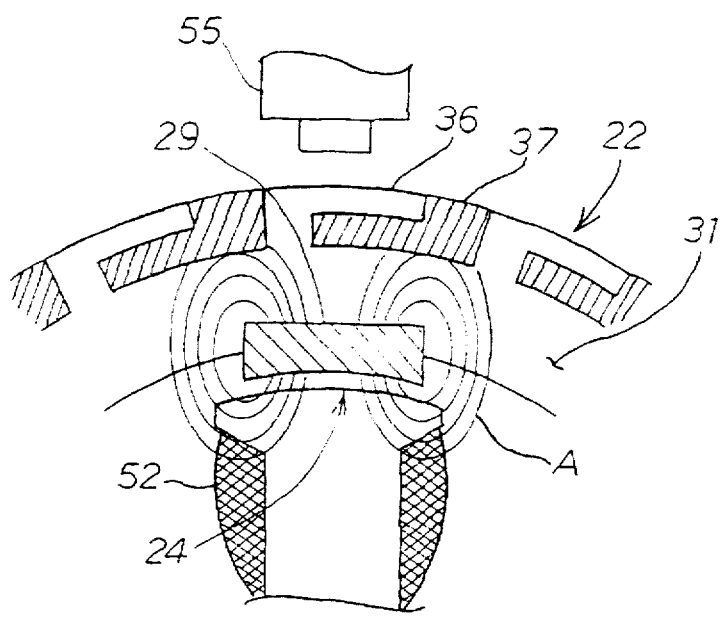

1

ELECTRIC MOTOR

BACKGROUND OF THE INVENTION

1. Field of the Invention:

The present invention relates to an improvement in an electric motor having a mechanism for detecting the rotational position of a rotor thereof.

2. Description of the Related Art:

One example of conventional brushless electric motors is schematically shown in FIG. 8 hereof.

The electric motor 100 is composed of a motor housing 102, a stator 103 secured internally of the motor housing 102, a rotor 104 disposed internally of the stator 103 concentrically therewith, a position detector plate 106 secured to a rotor shaft 105 disposed concentrically with the rotor 104, and a sensor 107 mounted to the motor housing 102.

The stator 103 includes a plurality of cores 109 each composed of a plurality of laminated plates, and coils 110 wound around the cores 109.

The rotor 104 comprises the rotor shaft 105 passing centrally therethrough, a yoke body 111 mounted to the rotor shaft 105, a rotor yoke 112 composed of a plurality of laminated plates mounted to the yoke body 111, and a plurality of magnets 113 mounted to the outer peripheral surface of the rotor yoke 112.

Reference numerals 116 and 117 designate a pulse generating circuit and an exciting circuit, respectively.

For causing the rotor 104 to be rotated, the rotational position of the rotor 104 is first detected, whereafter an exciting current corresponding to the magnetic pole position of the rotor 104 is supplied to the coil 110 of the stator 103 to excite the cores 109. Thus, detection of the position of the rotor 104 is an extremely important factor.

In the electric motor 100, however, the position detector plate 106 is separately required, thus adding up the number of components of the motor and rendering the latter complex in construction. Further, the position detector plate 106 should be subjected to high precision working, whereby it becomes expensive. Moreover, concerns about the assemblying error relative to the motor remain even when the position detector plate 106 is worked extremely precisely.

SUMMARY OF THE INVENTION

It is an object of the present invention to provide an electric motor having a high-precision position detector mechanism which is simple in construction.

According to the present invention, there is provided an electric motor comprising a rotor rotational position indicator formed-integrally with a pole field portion of a rotor thereof, and a notch disposed between the pole field portion and the rotor rotational position indicator for suppressing the magnetic influence. By virtue of the notch, the pole field and its magnetic influence upon a sensor can be suppressed, whereby appropriate home position and incremental pulses can be generated and accurate detection of a rotational position of the rotor is enabled.

Preferably, the notch is filled with nonmagnetic materials so that rigidity of the rotor is compensated and the shape of the notch or clearance can be maintained constant.

BRIEF DESCRIPTION OF THE DRAWINGS

Preferred embodiments of the present invention will be described below with reference to the accompanying drawings, in which:

FIG. 3A–FIG. 3C are views schematically illustrating the operation of the generator motor according to the present invention, FIG. 3A showing a rotor with a notch confronting a magnetic sensor, FIG. 3B showing an inverted L-shaped portion as opposed to a magnetic sensor, FIG. 3C showing a magnetic flux passage schematically.

DETAILED DESCRIPTION OF THE PREFERRED EMBODIMENT

Figure 1:
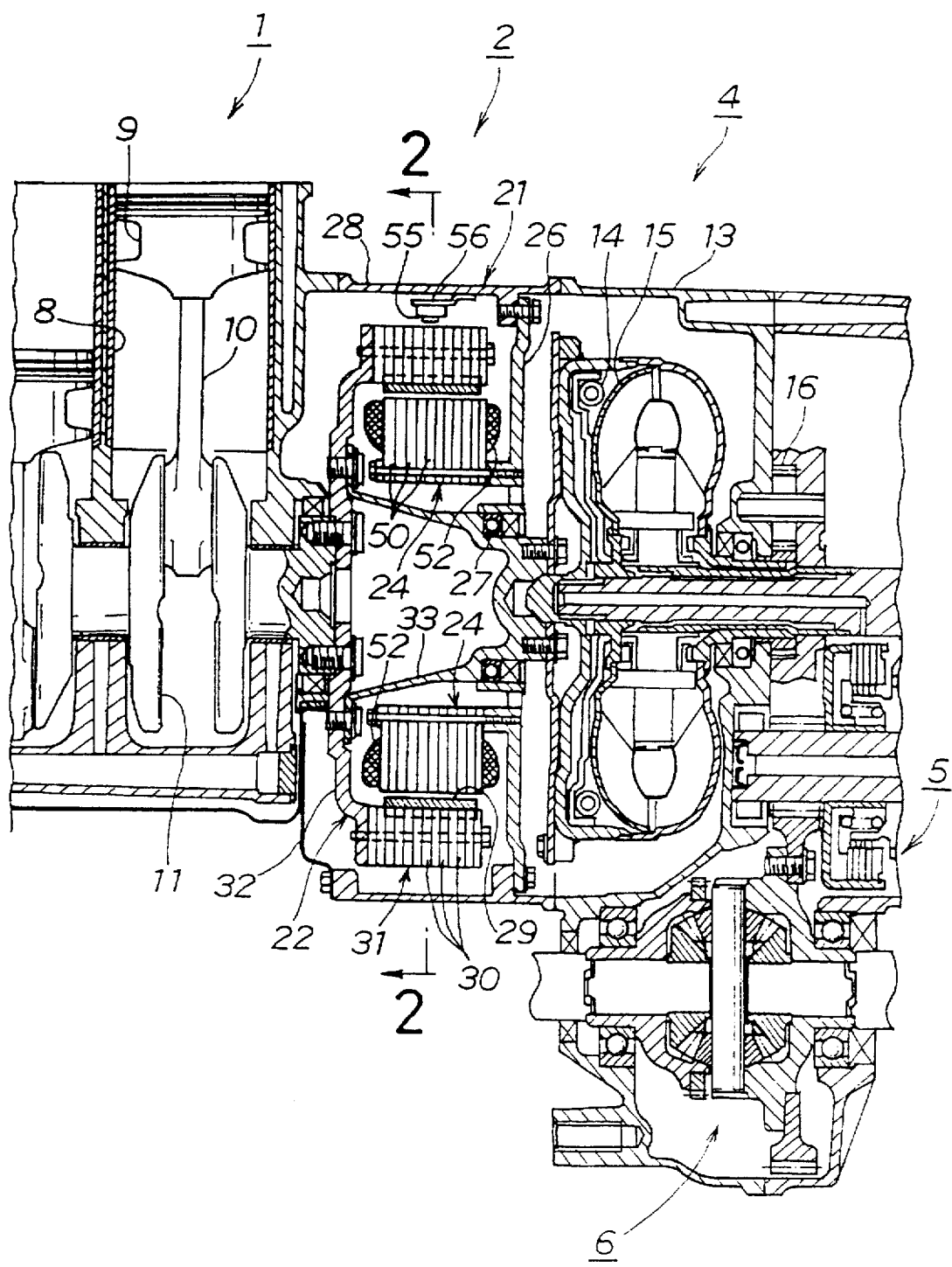
FIG. 1 is a cross-sectional view illustrating the essential portions of a hybrid vehicle drive system employing a generator motor according to the present invention.

Referring to FIG. 1, a hybrid vehicle drive system comprises an engine 1, a generator motor 2, a transmission 4, a clutch 5 and a differential gear 6.

The engine 1 comprises a cylinder 8, a piston 9, a con'rod 10 and a crankshaft 11.

The transmission 4 comprises transmission housing 13, a torque convertor 15 having a lock-up clutch 14, and an automatic transmission mechanism 16.

The generator motor 2 comprises a cup-shaped rotor 22, stator 24 disposed internally of the rotor 22 concentrically therewith, a motor housing 21 having a housing cover 26 and a housing body 28 and being designed for covering external peripheries of the rotor 22 and stator 24, and a bearing 27. The housing stator 24 is fixedly secured to the housing cover 26.

The rotor 22 comprises a disc-shaped yoke body 32, a rotor yoke 31 composed of a plurality of laminated plates 30 and secured to an outer periphery of the yoke body 32, a plurality of magnets 29 retained by an inner periphery of the rotor yoke 31, and a shaft member 33 secured to the yoke body 32.

Figure 2:
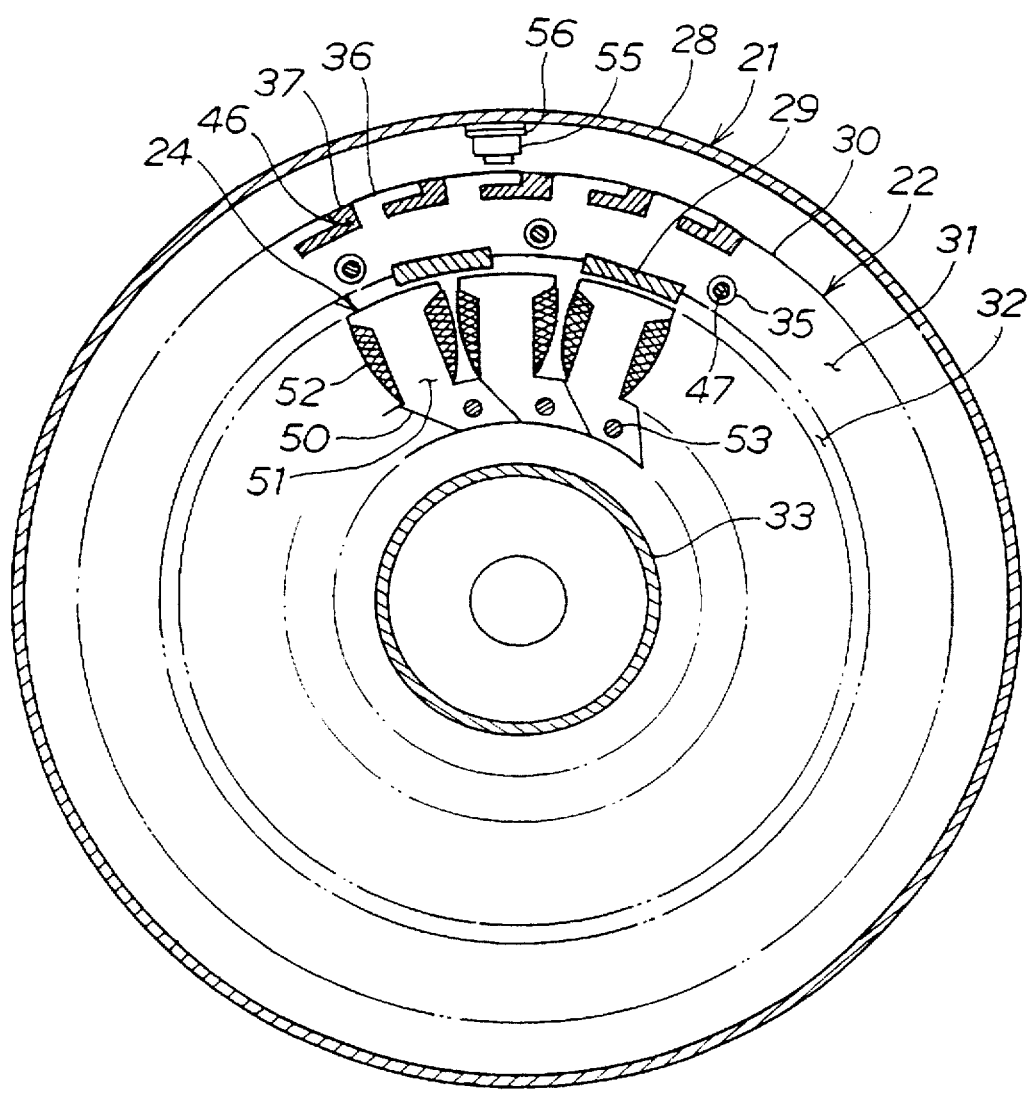
FIG. 2 is an enlarged partial cross-sectional view taken along line 2—2 of FIG. 1.

Referring now to FIG. 2, the rotor yoke 31 comprises bolt openings 35 for securing the rotor yoke 31 to the yoke body 32, inverted L-shaped portions 36 projecting outwardly from an outer periphery of the rotor yoke 31 for serving as rotational position indicators, L-shaped notches 37 making pairs with the inverted L-shaped projections 36, and non-magnetic materials 46 filled into the L-shaped notches 37. The rotor yoke 31 is secured to the yoke body 32 by means of bolts 47 passing through the bolt openings 35.

The stator 24 is comprised of cores 51 and coils 52 wound around the cores 51. Each core 51 is composed of laminated plates 50 and mounted to the housing cover 26 (see FIG. 1) by means of bolts 53.

Outside the rotor 22, there is provided a magnetic sensor 55 for detecting the position of the rotor 22, which is secured to a stay 56.

Operation of the generator motor will now be described with reference to FIG. 3A to FIG. 3C.

In FIG. 3A, as the crankshaft 11 rotates, the rotor 22 also rotates. When one L-shaped notch 37 disposed on the outer periphery of the rotor yoke 31 of the rotor 22 is positioned to confront a magnetically sensing portion 55a of the magnetic sensor 55, the magnetic sensor 55 outputs a detection signal corresponding to the notch 37, based on which a pulse generating circuit 58 generates a home position pulse.

When the rotor 22 is further rotated and one inverted L-shaped portion 36 on the outer periphery of the rotor yoke 31 is positioned to confront the magnetically sensing portion 55a of the magnetic sensor 55 as shown in FIG. 3B, the magnetic sensor 55 outputs a detection signal corresponding to the inverted L-shaped portion 36, based on which the pulse generating circuit 58 generates an incremental pulse.

Based on these pulses, electrical current corresponding to the rotational position of the rotor 22 is generated in an exciting circuit 59 and supplied therefrom to the coil 52 on the stator 24.

In FIG. 3C, reference character A designates a magnetic flux indicated by a sham line. Since the magnetic flux A is shut off by the L-shaped notch 37, the magnetic force at the inverted L-shaped portion 36 on the outer periphery of the rotor yoke 31 is attenuated compared to a case where the notch 37 is thereat. In other words, the L-shaped notch 37 effects the generation of appropriate home position and incremental pulses by suppressing the magnetic pole field generated by the magnet 29 secured to the rotor 22 and the coil 52 of the stator 24 to mitigate the magnetic influence of the pole field upon the magnetic sensor 55, whereby precise positional detection of the rotor 22 is enabled.

Figure 4:
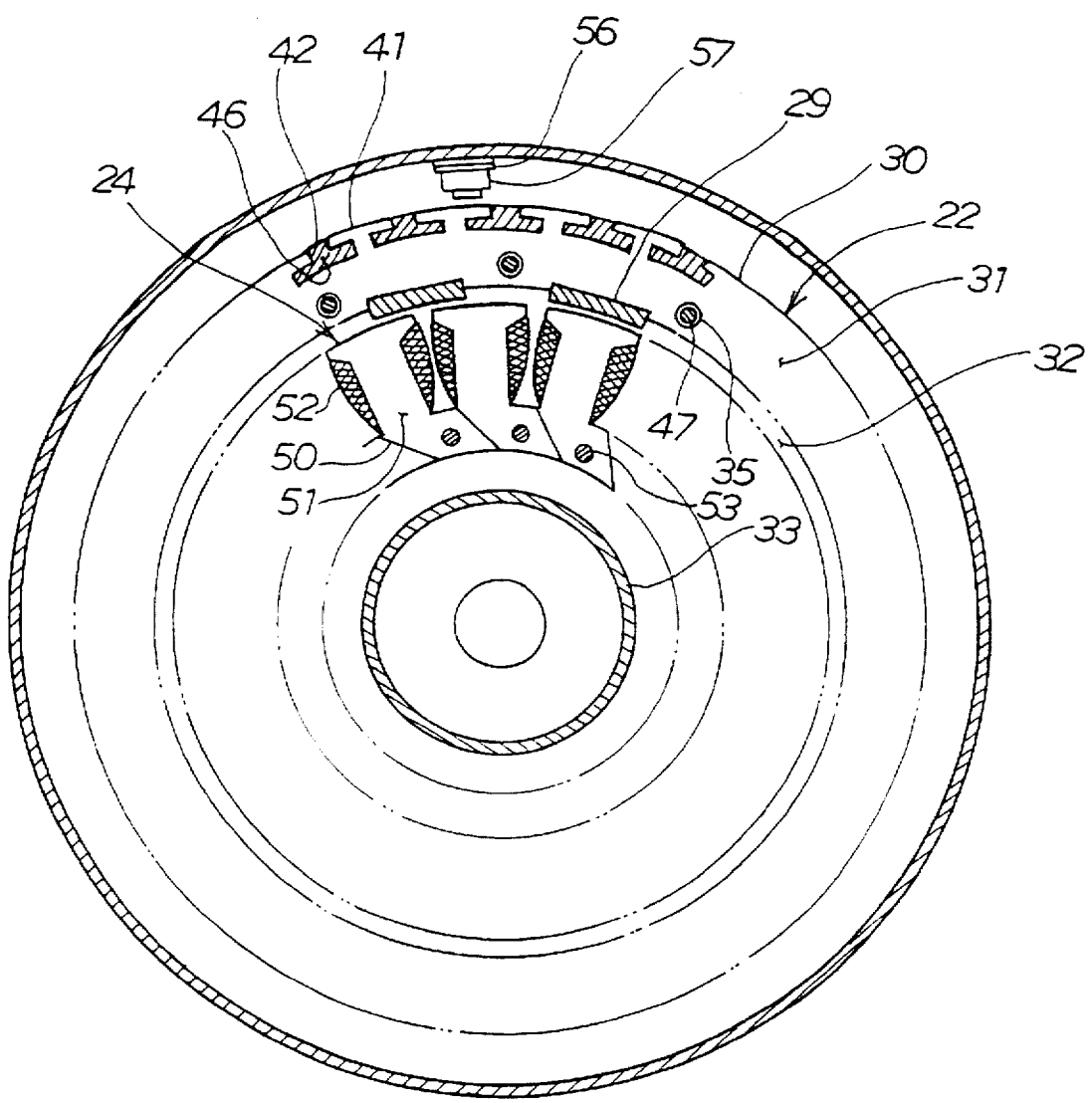
FIG. 4 is a schematic view illustrating a first embodiment of the generator motor according to the present invention.

FIG. 4 shows a first alteration of the generator motor of FIG. 2, with the notch of the rotor yoke 31 being configured differently.

The rotor 22 is comprised of a disc-shaped yoke body 32, a rotor yoke 31 composed of laminated plates 30 and secured to the outer periphery of the yoke body 32, magnets 29 retained by the inner periphery of the rotor yoke 31, and a shaft member 33 secured to the yoke body 32.

The rotor yoke 31 is comprised of bolt openings 35 for securing the rotor yoke 31 to the yoke body 32, T-shaped portions 41 projecting outwardly from the periphery of the rotor yoke 31 for serving as rotor rotational position indicators, inverted T-shaped notches 42 making pairs with the T-shaped portions 41, and nonmagnetic materials 46 filled into the inverted T-shaped notches 42. The rotor yoke 31 is secured to the yoke body 32 by means of the bolt openings 35 and bolts 47 passing therethrough.

The stator 24 is comprised of cores 51 and coils 52 wound around the cores 51. Each core 51 is composed of a plurality of laminated plates 50 and secured to the housing cover 26 (see FIG. 1) by means of bolts 53.

Outside the rotor 22, there is provided a magnetic sensor 55 for detecting the rotational position of the rotor 22. The magnetic sensor 55 is secured to a stay 56.

Figure 5:
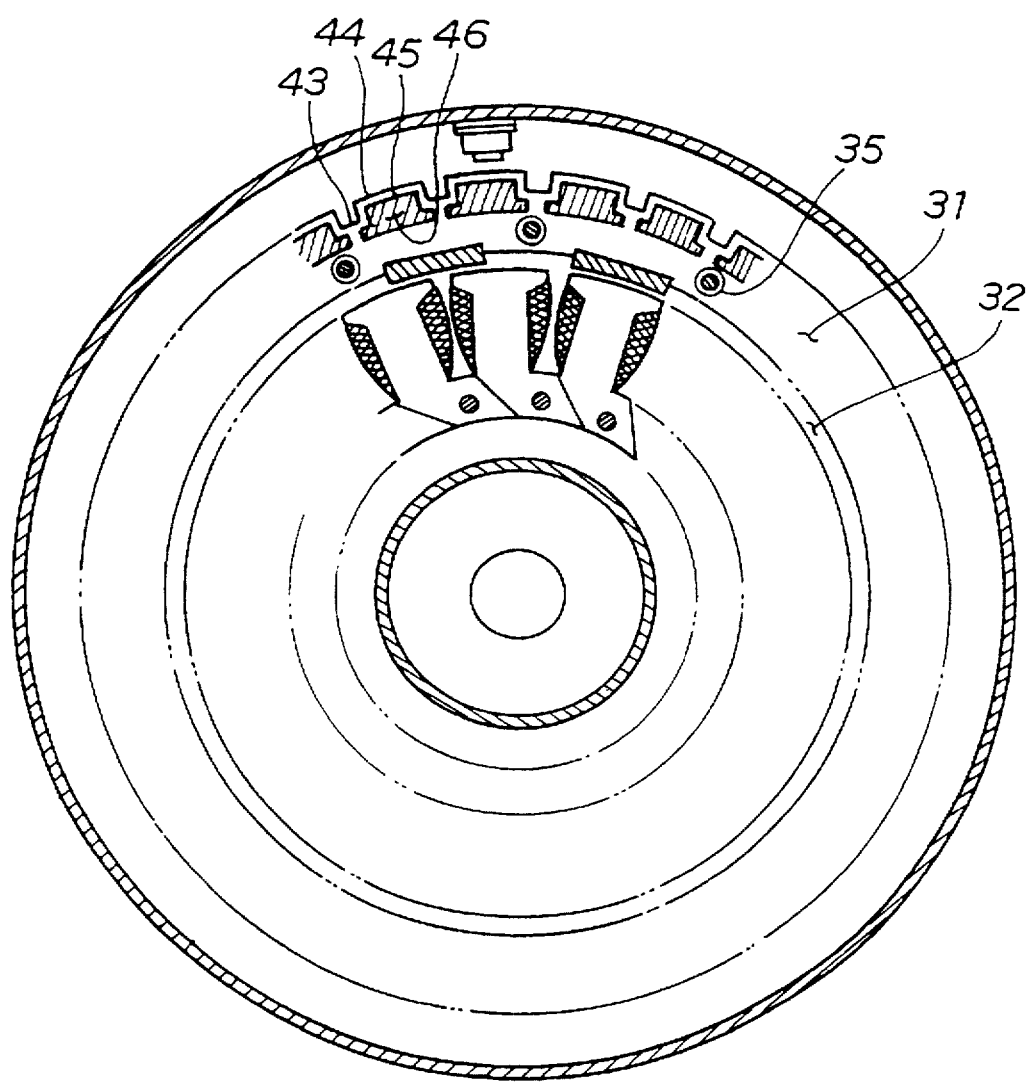
FIG. 5 is a schematic view illustrating a second embodiment of the generator motor.

FIG. 5 shows a second alteration of the generator motor of the present invention, with the notch configured differently from that of the first alteration of FIG. 4. Description made in connection with the first alteration will not be repeated, and only altered portions will be described.

The rotor yoke 31 comprises bolt openings 35 for securing the rotor yoke 31 to the yoke body 32, substantially U-shaped cutouts or recesses 43 formed on the outer periphery of the rotor yoke 31, inverted U-shaped position indicators 44 pairing with the U-shaped recesses 43, square holes 45 provided internally of the inverted U-shaped portions 44, and nonmagnetic materials 46 filled into the square holes 45.

As can be seen from the above, the "notches" for suppressing the magnetic influence as described in relation to the embodiment of FIG. 2 and alteration of FIG. 4 should not necessarily be "notches". They may also be "holes" as explained in connection with the present alteration.

Figure 6:
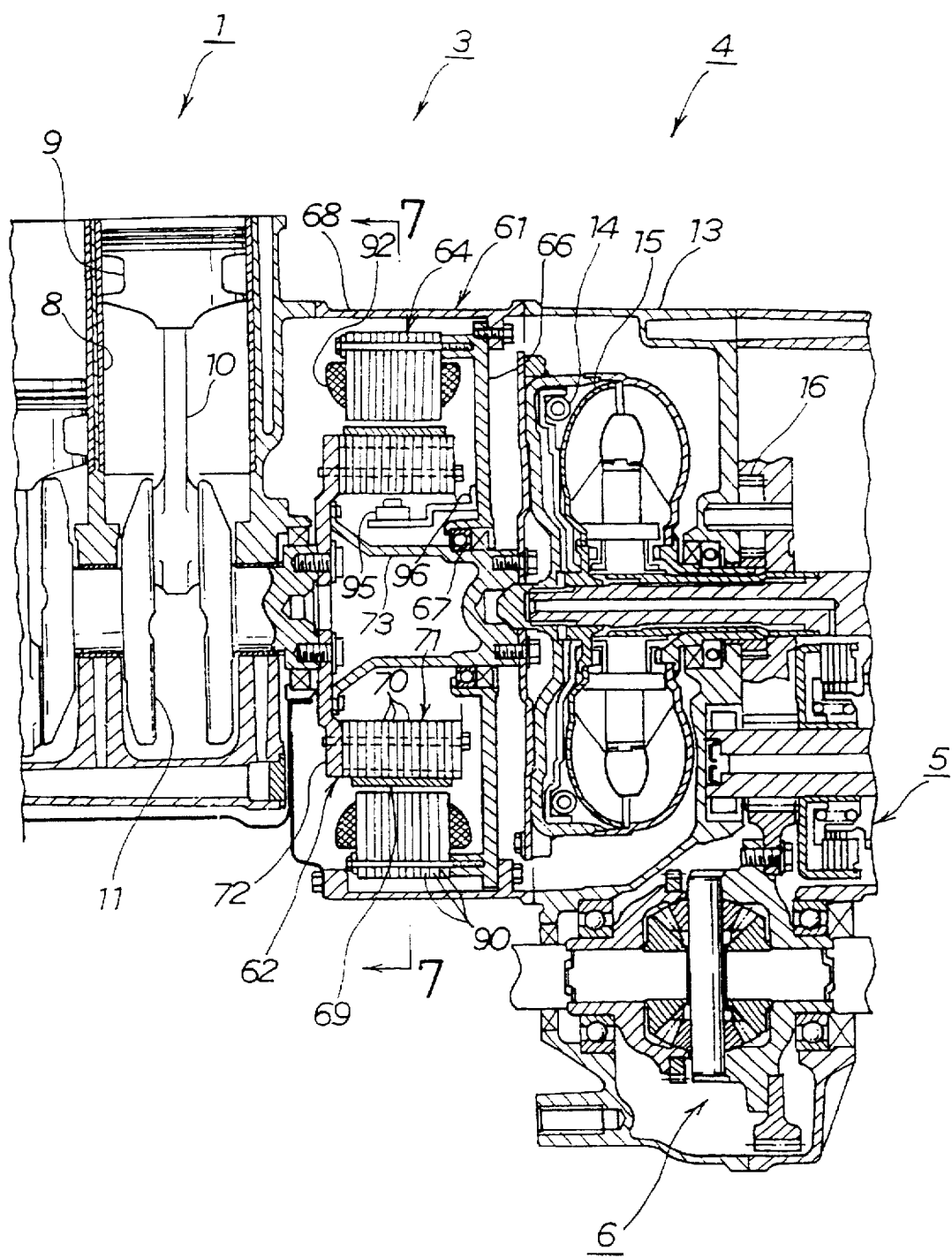
FIG. 6 is a cross-sectional view illustrating essential portions of an altered embodiment of the hybrid vehicle drive system.

FIG. 6 is a cross-sectional view showing the relevant portions of a separate embodiment of the hybrid vehicle drive system.

The hybrid vehicle drive system comprises an engine 1, a generator motor 3, a transmission 4, a clutch 5, and a differential gear 6.

The engine 1 is comprised of a cylinder 8, a piston 9, a con'rod 10 and a crankshaft 11.

The transmission 4 is comprised of a transmission housing 13, a torque convertor 15 having a lock-up clutch 14, and an automatic transmission mechanism 16.

The generator motor 3 is comprised of a cup-shaped inner rotor 62, a stator 64 disposed externally of the rotor 62 concentrically therewith, a motor housing 61 composed of a housing cover 66 and a housing body 68 and covering the outer peripheries of the inner rotor 62 and stator 64, and a bearing 67. The stator 64 is fixedly secured to the housing cover 66.

The inner rotor 62 is comprised of a disc-shaped yoke body 72, a rotor yoke 71 composed of laminated plates 70 and secured to the outer periphery of the yoke body 72, magnets 69 retained by the outer periphery of the rotor yoke 71, and a shaft member 73 secured to the yoke body 72.

Figure 7:
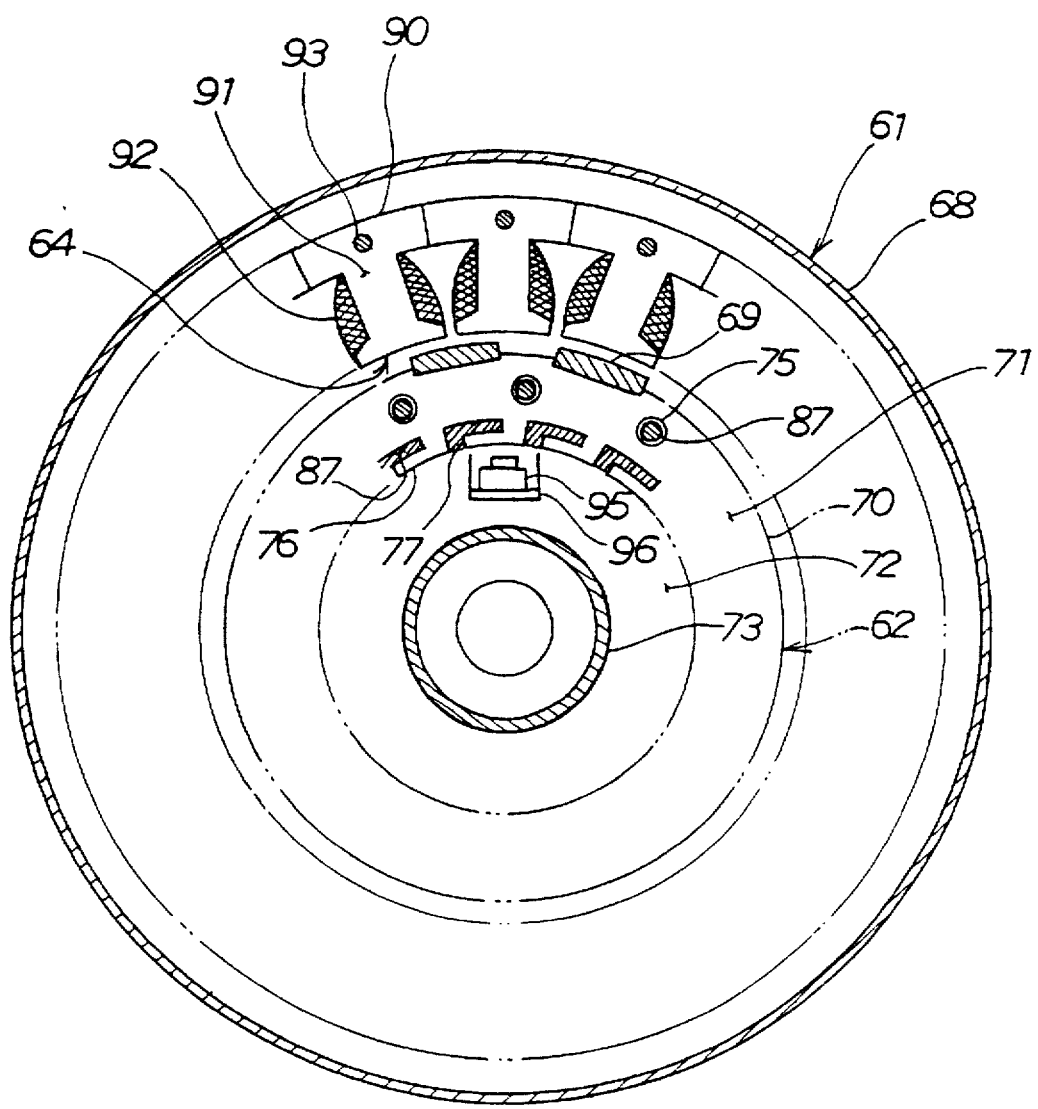
FIG. 7 is an enlarged partial cross-sectional view taken along line 7—7 of FIG. 6.
Figure 8:
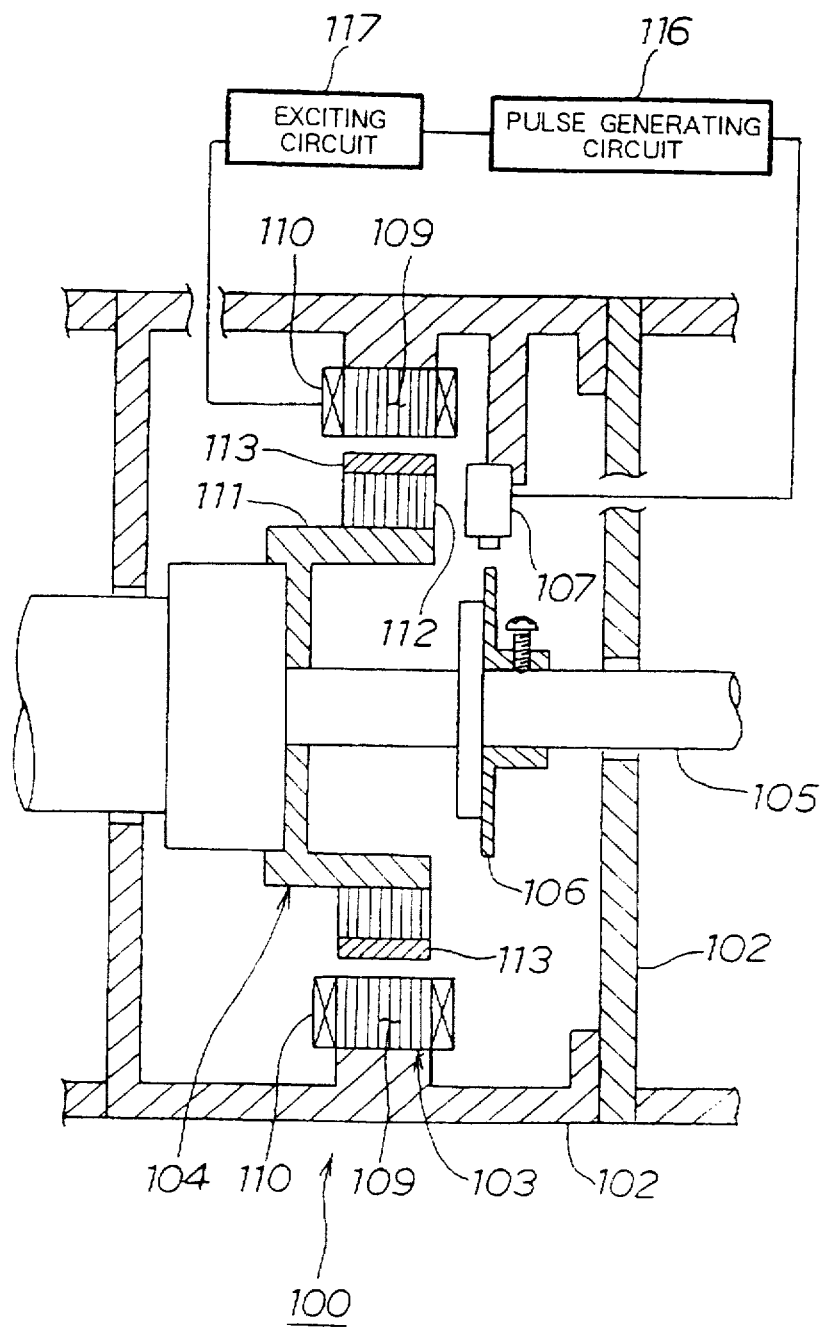
FIG. 8 is a cross-sectional view schematically illustrating a conventional brushless electric motor.

Referring to FIG. 7, the rotor yoke 71 is comprised of bolt openings 75 for securing the rotor yoke 71 to the yoke body 72, L-shaped portions 76 projectedly disposed on the inner periphery of the rotor yoke 71 for serving as rotor rotational position indicators, inverted L-shaped notches 77 pairing with the L-shaped portions 76, and nonmagnetic materials 86 filled into the inverted L-shaped notches 77. The rotor yoke 71 is secured to the yoke body 72 by means of the bolt openings 75 and bolts 87 passing therethrough.

The stator 64 includes a plurality of cores 91 and coils 92 wound around the cores 91. Each core 91 is composed of a plurality of laminated plates 90 and mounted to the housing cover 66 (see FIG. 6) through bolts 93.

Internally of the inner rotor 62, there is provided a magnetic sensor 95 for detecting the rotational position of the inner rotor 62. The magnetic sensor 95 is secured to a stay 96.

Although the present invention has been discussed in relation to a generator motor as applied to a hybrid vehicle drive system, it should not be construed as being limited to the generator motor. The invention may readily be applied to motors and generators in general.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An electric motor comprising:
   a rotor having a rotor yoke with first and second peripheries, said rotor yoke including a magnetic pole field portion and at least one rotation position indicator integral therewith, said at least one rotation position indicator being located adjacent the first periphery of said rotor yoke and said magnetic pole field portion being located adjacent the second periphery of said rotor yoke;
   a stator disposed in proximity to said second periphery to magnetically interact with said magnetic pole field portion;
   a sensor disposed in proximity to said first periphery for sensing said at least one rotation position indicator and for controlling rotation of the rotor; and
   at least one notch formed in said rotor yoke between said magnetic pole field portion and said at least one rotation position indicator.

2. An electric motor according to claim 1, wherein said notch is filled with nonmagnetic materials.

3. An electric motor according to claim 2, wherein said notch has an L-shaped configuration.

4. An electric motor according to claim 2, wherein said notch has an inverted T-shaped configuration.

5. An electric motor according to claim 2, wherein said notch comprises a hole.

* * * * *